US011496508B2

(12) United States Patent
Carlson et al.

(10) Patent No.: US 11,496,508 B2
(45) Date of Patent: Nov. 8, 2022

(54) CENTRALIZED SECURITY PACKAGE AND SECURITY THREAT MANAGEMENT SYSTEM

(71) Applicant: Target Brands, Inc., Minneapolis, MN (US)

(72) Inventors: Chris Carlson, Minneapolis, MN (US); Adam Lesperance, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 168 days.

(21) Appl. No.: 16/940,140

(22) Filed: Jul. 27, 2020

(65) Prior Publication Data
US 2021/0092149 A1 Mar. 25, 2021

Related U.S. Application Data

(60) Provisional application No. 62/905,049, filed on Sep. 24, 2019.

(51) Int. Cl.
*H04L 9/40* (2022.01)

(52) U.S. Cl.
CPC ...... *H04L 63/1441* (2013.01); *H04L 63/0236* (2013.01); *H04L 63/1416* (2013.01); *H04L 63/1425* (2013.01); *H04L 63/20* (2013.01)

(58) Field of Classification Search
CPC ............ H04L 63/1441; H04L 63/1425; H04L 63/1416; H04L 63/20

USPC ........................................................... 726/23
See application file for complete search history.

(56) References Cited

U.S. PATENT DOCUMENTS

| 6,298,445 | B1 | 10/2001 | Shostack et al. |
| 8,065,712 | B1 | 11/2011 | Cheng et al. |
| 8,904,529 | B2 | 12/2014 | Ward |
| 2005/0276228 | A1 | 12/2005 | Yavatkar et al. |
| 2011/0197280 | A1* | 8/2011 | Young .................... G06F 21/552 726/24 |
| 2012/0054860 | A1* | 3/2012 | Wyschogrod ....... H04L 63/1416 726/22 |
| 2013/0091577 | A1* | 4/2013 | McGinley ............... G06F 21/00 726/25 |
| 2017/0264589 | A1 | 9/2017 | Hunt et al. |
| 2017/0302701 | A1* | 10/2017 | Phanse .................... H04L 63/20 |
| 2018/0227329 | A1* | 8/2018 | Lv ........................... H04L 63/04 |

* cited by examiner

*Primary Examiner* — Teshome Hailu
(74) *Attorney, Agent, or Firm* — Fish & Richardson P.C.

(57) ABSTRACT

A network security system centrally manages security packages and deploy them to a network host that is identified as potentially compromised. A security package is selected or assembled to be targeted to the identified host. Security packages are designed to isolate identified hosts from other network resources and collect forensic information from the hosts without interfering with operations of the hosts. Once forensic information is collected, software packages can be dissolved from hosts. Collected forensic information can be used to analyze and mitigate threats on hosts.

18 Claims, 9 Drawing Sheets

CENTRALIZED SECURITY PACKAGE AND SECURITY THREAT MANAGEMENT SYSTEM

CROSS-REFERENCE TO RELATED APPLICATIONS

This application claims the benefit of U.S. Provisional Application Ser. No. 62/905,049, filed Sep. 24, 2019. The disclosure of the prior application is considered part of (and is incorporated by reference in) the disclosure of this application.

TECHNICAL FIELD

This document describes systems and methods for network security management, including generating and deploying security packages onto potentially compromised client devices to obtain threat information and to neutralize security threats.

BACKGROUND

Network security includes policies, practices, and devices adopted to prevent and monitor unwanted access, misuse, modification, or attacks on computer networks and network-accessible resources. Various types of threats can compromise network security. For example, malware is software intentionally designed to cause damage to network hosts, such as computers, servers, clients, and other devices connected to computer networks. Malware causes such damage when it is implanted or introduced into a target computer, and can take the form of executable code, scripts, active content, and other software. Malware can be described as various terms, such as computer viruses, worms, Trojan horses, ransomware, spyware, adware, scareware, etc. Various strategies, such as antivirus software and firewalls, are used to protect against introduction of malware and check for presence of malware and malicious activity on network hosts.

Endpoint security can be used to protect a network when accessed via remote devices, such as laptops and wireless devices, which may create a potential entry point for security threats. Endpoint security is designed to secure each endpoint on the network created by these devices. An endpoint security system may include security software located on a server or gateway within the network, and client software preinstalled on each of the endpoints. The client software may include antivirus, antispyware, firewall, and host-based intrusion systems (HIDS). The server can update the client software periodically or when needed.

SUMMARY

The present disclosure relates to systems, methods, devices, and computer program products for more efficiently and effectively managing the security of a network, including generating and deploying security packages onto potentially compromised network devices to retrieve relevant information to security threats, to isolate the network devices, and to collect forensic information which can be used to resolve the threats. For example, a network security system can centrally manage software packages that are deployed to network hosts (e.g., client devices) that have been identified to be potentially compromised. Such software packages deployed to a network host can be designed to isolate the network host from other network resources and collect forensic information from the network host without interfering with operations of the network host. The forensic information can include a variety of details. Once forensic information is collected, the software package can be dissolved from the network host. The collected forensic information can be used by, e.g., security analysts, to analyze and mitigate the threat on the identified network host.

Instead of having network security applications preinstalled and updated on host devices to provide endpoint management solutions, the technologies disclosed herein permit for software packages to be stored and managed on a central server before deployed to a particular network host. Software packages can be in the form of self-contained, single executable files which are simply executed on a network host without installation process. Software packages will not be run on a network host until the network host is identified as potentially infected and the software package is deployed to the network host.

Some embodiments disclosed herein permit for security analysts to push out software packages to hosts after the hosts have been identified to be potentially infected. Such software packages provide surgical approach to quickly get control of the hosts, and take actions to collect digital forensic information from the hosts while making minimal interference with operations of the hosts. The software packages can report the collected information back to a server system for further analysis of the threats.

The technologies disclosed herein provide a system architecture for readily and quickly gathering digital forensic information from client devices that have been potentially compromised. Software packages are saved and managed on a server, and will be deployed to a client device once the client device is identified to be potentially compromised. In some implementations, software packages are prebuilt to be compatible with different attributes (e.g., operating systems) of client devices, different types of security threats, different security tools, and/or other requirements of client devices. Then, the software packages are stored on a server. When a particular client device is identified to be infected, one of the software packages are selected based at least in part on the identification of the particular client device, and deployed to the client device. Alternatively or in addition, when an affected client device is identified, a software package can be dynamically assembled to suit the client device by complying with, for example, operating system of the device, type of the security threat, security tools needed to run.

The software packages need not be installed and operated on the client device until the client device is identified to be potentially infected. The software packages for gathering digital forensic information can be readily pushed out to client devices without having to be preinstalled through use of other software applications on client devices.

The software packages can be designed to collect information from the infected client device and send back the information to the server so that the information is used to identify actual threats and determine solutions to remove them. Example pieces of the information collected include system logs, window events, firewall logs, SEP logs, driver logs, memory logs, registry, etc.

The technologies disclosed herein can also permit for the infected client device to be isolated from other network resources, while, at the same time, the deployed software package collect and send back the forensic information from the isolated client device to the server or a security analyst for further analysis and remedial process. The software package does not shut down other operations of the client device while running on the client device, thereby minimizing impact on the client device. For example, the deployed software package does not shut down the entire host. Rather, it leaves the host partially operable intentionally to allow at least some functionalities (e.g., based on a whitelist) on the host while the host can be properly isolated and evidence can be collected. The software package can be selectively configured to perform other functions, such as notifying a user, gather artifacts, deleting files, hashing files, copying files, dumping memory, collecting network security management logs, etc.

Particular embodiments described herein include a method for analyzing a security threat. The method include storing a plurality of candidate security packages in a central server; identifying a network host being affected by a security threat; selecting a security package from the candidate security packages, the security package formatted to be executable on the network host; transmitting the security package from the central server to the network host, the security package executed on the network host and configured to cause the network host to collect forensic information from a plurality of forensic data sources of the network host while permitting for the network host to run tasks thereon; retrieving the forensic information from the network host; and outputting the forensic information to a security computing device, wherein the forensic information is usable to mitigate the security threat on the network host.

In some implementations, the system can optionally include one or more of the following features. The method may include updating, using the central server, the plurality of candidate security packages in the central server. The plurality of candidate security packages may be designed to mitigate security threats on affected network hosts, and isolate the affected network hosts from other network hosts in a network. The method may include processing, using the central server, the forensic information to generate formatted data, the formatted data being used for security analysis. The formatted data may include a tabular data format. The security package may be configured as a self-contained, single executable file. The security package may be configured to create a log file based on the forensic information. At least some of the plurality of forensic data sources may provide redundant forensic information. The forensic information may include one or more of system logs, window events, firewall logs, SEP logs, driver logs, memory logs, and registry on the network host. The security package may be configured to cause the network host to be isolated from other network resources. The security package may be configured to dissolve after the forensic information is collected from the plurality of forensic data sources of the network host. The security package may be configured to perform at least one of collecting a file, hashing a file, deleting a file, and creating a memory dump.

Particular embodiments described herein include a method of identifying a security threat. The method include running a plurality of processes using a network host; receiving, using the network host, a security package from a central server after the network host is identified as being affected by a security threat; and executing, using the network host, the security package to cause the network host to perform stopping one or more of the running processes on the network host, the one or more of the running processes being determined based on a security rule; permitting for the other running processes to continue to run on the network host; collecting forensic data from a plurality of forensic data sources associated with the other running processes, the plurality of forensic data providing data that are at least partially redundant; creating a log file from the forensic data; and transmitting the log file to the central server.

In some implementations, the system can optionally include one or more of the following features. The security package may cause the network host to perform collecting a file from the network host and sending the file to the central server; hashing a file on the network host; and deleting a file from the network host. The security package may cause the network host to perform creating a memory dump on the network host. The forensic data sources may include running processes, files being used, incoming and outgoing network traffics, and open ports. The security package may cause the network host to perform dissolving the security package from the network host. The security package may be configured as a self-contained, single executable file. The security package may be stored and managed in the central server before deployed to the network host.

Particular embodiments described herein include a non-transitory computer-readable medium having stored therein a program for causing a computer to execute a process of identifying a security threat on a network host. The process may include stopping one or more of running processes on the network host, the one or more of running processes being determined based on a security rule; permitting for the other running processes to continue to run on the network host; collecting forensic data from a plurality of forensic data sources associated with the other running processes, the plurality of forensic data providing data that are at least partially redundant; creating a log file from the forensic data; and transmitting the log file to a central server.

The devices, system, and techniques described herein may provide one or more of the following advantages. First, some embodiments described herein include a centralized network security system that stores and deploy software security packages to network hosts when the hosts are identified as being potentially compromised. No static file or program is stored or preinstalled on hosts, and security packages can be deployed to hosts only when the hosts are identified as being affected by security threats. The security system described herein can centralize the security management of multiple hosts in the network by storing and updating one or more security packages for multiple hosts in the network.

Second, the security system described herein simplifies a way to manage and update security software for multiple hosts and reduces burden on network resources because a security package for one or more hosts are stored and managed to be up-to-date in a central server. The security server does not have to monitor the security status of hosts and regularly transmit security updates to them.

Third, once a potentially-compromised host is identified, the centralized security system can quickly select one of existing security packages that has been formatted to the identified host and deploy the selected one to the host. Alternatively, the security system can dynamically build a security package suitable for the identified host and deploy it to the host. Thus, the security package selected or built for the host reflects the current, or most up-to-date, status of the identified host.

Fourth, centrally-managed security packages increases flexibility in security management and treatment on hosts because the packages can be conveniently configured by, e.g., security analysts, to selectively perform one or more functions on the host.

Fifth, the security system described herein reduce or eliminate burden on network hosts for security monitoring and investigation because no security software need to be preinstalled and constantly run on the hosts. The technologies herein do not deploy security packages to hosts until the hosts are identified as potentially affected. Further, once deployed to hosts, security packages do not shut down the entire operations of the hosts, but permit for most of the operations to continue to run on the hosts while the security packages perform security-related functions, such as gathering forensic evidence. Security packages can be configured to not interfere with processes that are currently running on hosts.

Sixth, once deployed, the security package can be quickly executed without installation on the host and perform functions that have been preconfigured prior to the deployment. For example, the security package can isolate the host from the network to prevent the other network resources from being impacted by the threat. Further, the security package can access a plurality of forensic data sources on the host and collect forensic information from the sources, some of which can be redundant. Such redundancy in the collected forensic information increases the likelihood of unusual or sophisticating malicious events or activities (which are not easily identifiable) being identified.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Figure 1:
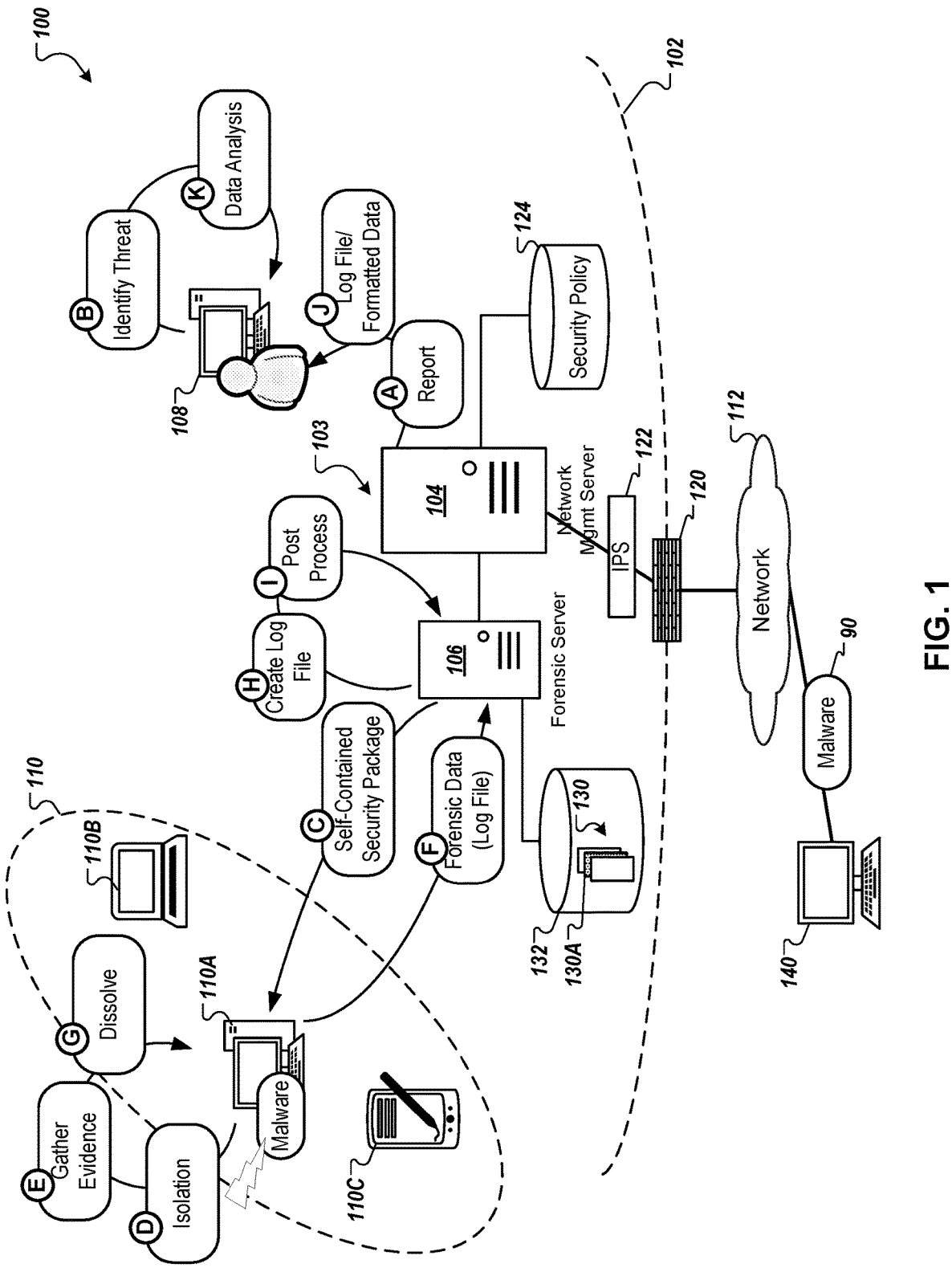
FIG. 1 is a block diagram of an example computer network environment for implementing a centralized security management.

FIG. 1 is a block diagram of an example computer network environment 100 for implementing a centralized security management of the present disclosure. The computer network environment 100 includes at least two distributed networks, such as a private network 102 and a public network 112. The private network 102 can be of various types, such as a local area network (LAN), a wide area network (WAN), a combination thereof, or any other intranet configuration. The public network 112 may be the Internet or any other publicly accessible computer network.

The private network 102 can include one or more endpoint devices, such as a network management server 104, a forensic server 106, an analyst computing device 108, a plurality of network hosts 110 (including 110A, 110B, and 110C), and other computer or electronic devices. In this document, a network management server 104 and a forensic server 106 can be collectively referred to as a network server 103. Endpoint devices can be connected to the private network 102 through a network interface card, modem, and/or other suitable means for establishing and receiving network communications. The network hosts 110 can be of various types, such as a desktop computer 110A, a laptop computer 110B, a mobile computer 110C, and other suitable computers. The network hosts 110 may communicate with the private network 102 via a virtual private network (VPN) or other suitable secure communication protocols.

The private network 102 can be guarded by a firewall 120 at a gateway connection to the public network 112 or other external network. The firewall 120 can be hardware and/or software for preventing communications forbidden by a security policy 124. The firewall 120 monitors and/or controls incoming and outgoing network traffic based on the security rules defined by the security policy 124. For example, the firewall 120 is designed to prevent unauthorized external users, such as a malware client 140, from accessing the private network 102 without permission.

In addition, the private network 102 may include an intrusion prevention system (IPS) 122 that is hardware and/or software for exercising access control to protect network computers and devices from exploitation. While firewalls can make access control decisions based on IP addresses or ports, instruction prevention systems can make access control decisions based on application content. The IPS 122 can perform inspection and analysis of network traffic flows, and detect and drop malicious traffic based on a security policy 124.

The firewall 120 and/or the IPS 122 can be configured to monitor and analyze network traffic carried by the private network 102 to detect inter-network access activities being performed or requested with respect to the private network 102. For example, the firewall 120 and/or the IPS 122 are configured to monitor network traffic employing HTTP or HTTPS protocols to detect attempts by hosts of the private network 102 to access the public network 112 or other resources external to the private network 102. In addition or alternatively, the firewall 120 and/or the IPS 122 are configured to detect attempts to access the public network 112 or other external resources by monitoring network traffic on ports (e.g., port 80 and 433) generated by hosts of the private network 102. The firewall 120 and/or the IPS 122 may also have access to network configuration information identifying each host or other device connected to the private network 102. As such, the firewall 120 and/or the IPS 122 can identify a particular device connected to the private network 102 that attempts to access the public network 112 or any other external network resource. In addition or alternatively, the firewall 120 and/or the IPS 122 can detect attempts by external devices, such as a malware client 140, to access the resources of the private network 102. The firewall 120 and the IPS 122 may be combined into a single device or set of devices.

The network management server 104 runs a network security application. The network management schemes using the security packages described herein can be implemented to improve the existing network security application of the network management server 104. An example of the network security application is available from Tanium Inc., Emeryville, Calif. The Tanium system includes functionalities to preinstall software on network hosts that can completely lock down potentially-compromised hosts and permit for information to be remotely gathered for those hosts.

Tanium uses a linear communication orbit formed by multiple nodes, and circulates instruction packets in a network through the linear communication orbit. It is understood that the technologies described herein can be used with other network security applications and systems.

The forensic server 106 is a central server that manages one or more security packages 130. Security packages 130 can be stored in a database 132 and centrally managed by the forensic server 106. Security packages 130 are designed and formatted to be executable on network hosts, such as different network hosts 110. Security packages 130 can be updated while stored in the database 132. Update of security packages can be performed regularly or as necessary. In addition or alternatively, security packages can be updated per a security analyst's request. Security packages 130 are not preinstalled on network hosts, and are only stored in the forensic server 106 until the network hosts are identified as potentially compromised.

As described herein, in some implementations, a security package 130 to be deployed is selected from the stored security packages 130 (also referred to herein as candidate security packages), which is formatted to be executed on a network host (e.g., the host 110A) that has been identified as being compromised (either potentially or actually). Alternatively or in addition, a security package 130 can be assembled to be suitable for a compromised host before deployed to the host.

Security packages 130 can be in the form of self-contained, single executable files, which do not have to be installed, but simply executed when deployed to hosts. Other formats are also possible, such as installable files.

In some implementations, the network management server 104 and the forensic server 106 can be operated as a single network server 105 performing both functionalities. In other implementations, the network management server 104 and the forensic server 106 can be operated as different servers that are communicatively connected to one another.

The analyst computing device 108 is used by a security analyst to monitor network security and identify hosts that appear to be potentially affected by security threats. The analyst computing device 108 can operate to receive an input from a security analyst for various security-related operations, and output information for the analyst to review. For example, the analyst computing device 108 is configured to receive an input from a security analyst to select or assemble a security package to be deployed, and configure the security package to selectively enable and disable functions to be performed when the security package is executed on a host. The analyst computing device 108 can operate to receive an input from a security analyst to deploy the selected and/or assembled security package from the central server (e.g., the network server 103) to an identified network host. The analyst computing device 108 can receive forensic evidence (e.g., a log file and/or processed data) collected by the security package deployed on a host. The analyst computing device 108 can output (e.g., display) the evidence to a security analyst so that the analyst can identify malware affecting the host and take actions to mitigate it. In addition or alternatively, the above operations (e.g., selection or assembly of a security package, enabling and disabling of security package functions, deployment of a security package, analysis of forensic data, identification of actual threats, mitigation solution, etc.) can be at least partially automated using the analyst computing device 108 with no or reduced manual input from security analysts.

Referring still to FIG. 1, an example operation of the centralized security management is described. The network management server 104 can monitor network communications coming in and out of the private network 102 and/or network configuration information associated with network hosts in the private network 102. If a suspicious event is identified with respect to a particular network host, such as the host 110A, the network management server 104 can report such identification to the analyst computing device 108 (Step A).

The analyst computing device 108 can be used to review the report and decide to take an action for further investigation (e.g., collecting evidence). For example, the analyst computing device 108 can receive and present the identification of a potentially-compromised host 110A to a security analyst. The analyst computing device 108 can be used to organize and/or analyze the report from the network management server 104. Upon reviewing and/or evaluating the report from the network management server 104, the analyst computing device 108 (or an analyst using it) can identify a potential threat on the network host 110A and determine that a further investigation is needed (Step B).

Once the affected host 110A is identified, a security package 130A can be deployed from the central forensic server 106 to the identified host 110A (Step C). As described herein, the software package 130A has not been deployed, installed, or executed on the client device until the host 110A is identified. The software package 130 can be readily pushed out to the identified host 110A without having to be preinstalled through use of other software applications on the host 110A. The security package 130 can be a self-contained, single executable file, which is executed on a host without installation. As described herein, the security package 130A can be selected from a plurality of candidate security packages 130 stored in the database 132 and managed by the forensic server 106. The security package 130A is selected that is formatted to be executed on the identified host 110A once deployed. Alternatively, once the affected host 110A is identified, the security package 130A can be built to be executed on the host 110A. As described herein, the security package 130A can be built to have one or more functionalities when executed on the host 110A. Such functionalities can be selective enabled and disabled using the analyst computing device 108 (e.g., based on an input from an analyst using the analyst computing device 108).

When the security package 130A is deployed and executed on the identified host 110A, the security package 130A can cause the host 110A to perform one or more functions. For example, the security package 130A can be designed to isolate the host 110A from other network resources (Step D). In addition or alternatively, the security package 130A can be configured to gather forensic evidence from the host 110A (Step E), and send the evidence (e.g., a log file) back to the forensic server 106 (Step F). Other functions can also be selectively performed, such as notifying a user, gather artifacts, deleting files, hashing files, copying files, dumping memory, collecting network security management logs, and other suitable functions. The functions to be performed can be selected manually by an analyst and/or automatically using the analyst computing device 108, prior to the deployment.

The security package 130A can be configured to maintain other operations of the host 110A to run while performing the desired functions. Therefore, the security package 130A minimizes impact on the host 110A while executing desired security-related functions on the host 110A. Once all the desired functions are performed, the security package 130A can dissolve from the host 110A (Step G).

When receiving the forensic evidence from the host 110A, the forensic server 106 can create a log file from the forensic evidence (Step H). The log file can include various pieces of information, such as system logs, window events, firewall logs, SEP logs, driver logs, memory logs, registry, etc. Alternatively, the log file can be created by the security package on the host and transmitted to the forensic server 106.

The forensic server 106 can perform a post process using the forensic evidence (Step I). For example, the post process can process the log file in various manners (e.g., formatting, synthesizing, annotating, etc.) so that the information contained in the log file becomes easy to read and analyze. The log file and/or the post-processed data (e.g., formatted data) can be transmitted to the analyst computing device 108 (Step J), and an analyst can review and analyze the log file and/or the post-processed data to identify the actual threat on the host and identify a solution to mitigate the threat and/or establish a plan to prevent occurrence of the same or similar threat on the network. (Step K).

Figure 2:
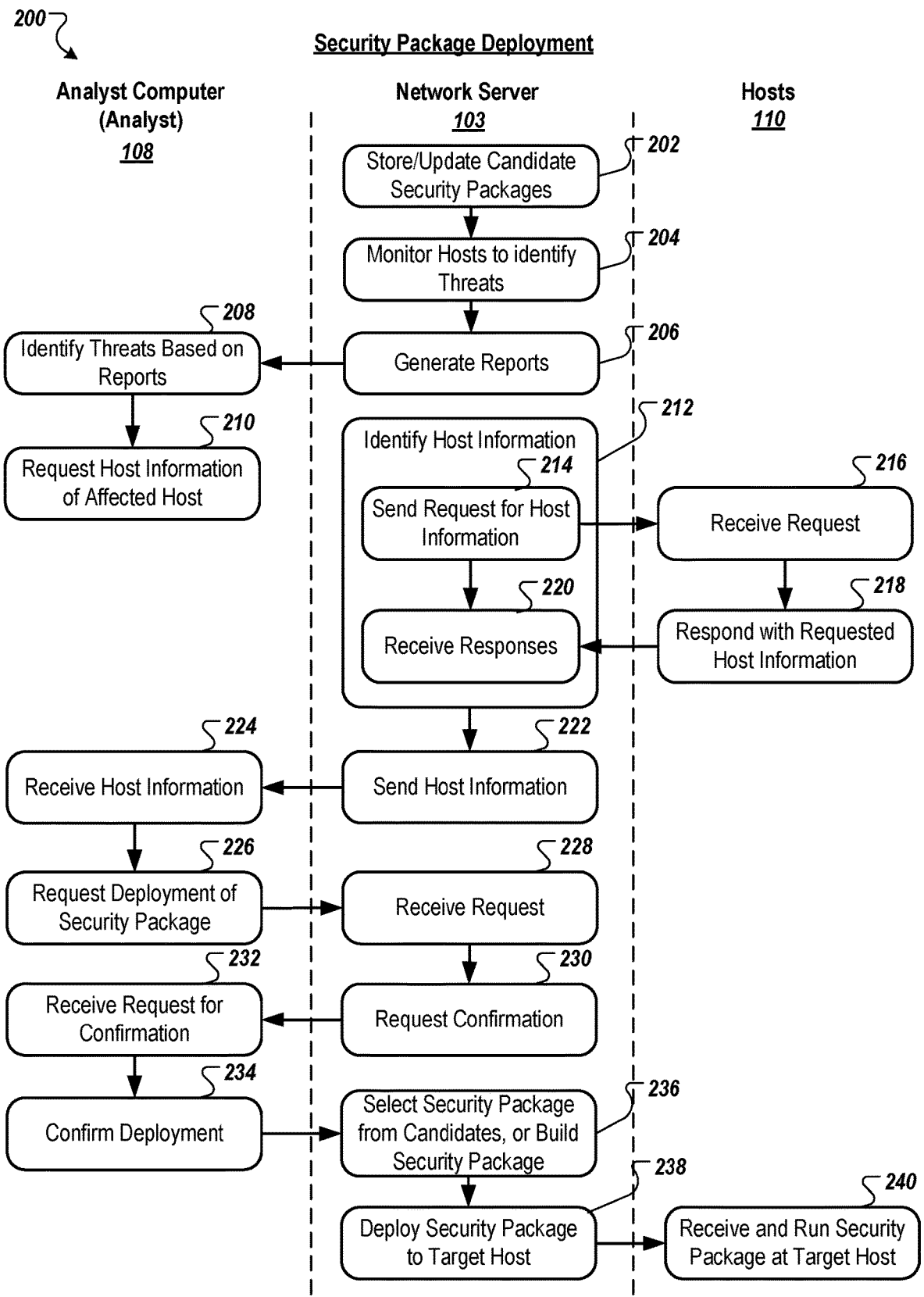
FIG. 2 is a flowchart of an example operation for deploying a security package.

FIG. 2 is a flowchart of an example operation 200 for deploying a security package. The network server 103 (e.g., the network management server 104 and/or the forensic server 106) operates to store and manage candidate security packages 130 (Block 202). For example, a plurality of candidate security packages 130 are centrally managed on the network server 103 and thus stored and/or updated by the network server 103. The network server 103 further monitors network hosts 110 to identify a potential threat on any of the hosts 110 (Block 204). The network server 103 can generate a report on the security monitoring and/or identification of suspicious events, and transmit it to the analyst computing device 108 (Block 206).

The analyst computing device 108 can be used to identify a potential threat on a particular host based on the report (Block 208). For example, a security analyst can analyze the report using the analyst computing device 108, and identify a suspicious event or file on a network host 110 based on the analysis of the report. Then, the analyst computing device 108 can be used to request host information of the identified network host 110 (Block 210). The requested host information can include a host name and/or an operating system (OS) of the host. In addition or alternatively, the host information can include other pieces of information about the host, such as physical address (e.g., MAC address, host ID, or server ID), host attributes (e.g., user-defined descriptions applied to the host, such as an attribute indicating the building where the host is located), and information about the servers, clients, and host protocols running on a particular host.

The network server 103 can identify host information of the identified host 110 (Block 212). In some implementations, the network server 103 can transmit a request for host information to the identified host (Block 214). Alternatively, the network server 103 can broadcast a request for host information in the network. The identified host (when the request is targeted) or a plurality of network hosts (when the request is broadcasted) can receive the request (Block 216) and respond with requested host information (Block 218). The network server 103 receives a response or a collection of responses from the identified host or the plurality of hosts (Block 220). Based on the response(s), the network server 103 can determine the host information of the host that was identified as being potentially compromised.

The network server 103 can transmit the identified host information to the analyst computing device 108 (Block 222), and the analyst computing device 108 receives the same (Block 224).

The analyst computing device 108 is used to request deployment of a security package suitable for the identified host (Block 226). For example, an analyst can provide an input, using the analysist computing device 108, to select one of the existing security packages (e.g., candidate security packages) based on the host information so that the selected security package is executable on the identified host. Alternatively, an analyst can provide an input, using the analyst computing device 108, to build a security package suitable for the identified host based on the host information. In addition or alternatively, the selection or building of a security package can be automatically performed using the analyst computing device (and/or the network server). Such selection or building of a security package can be transmitted as a request to the network server 103.

The network server 103 receives the request for deployment of a security package (Block 228). In some implementations, the network server 103 can transmit a request for confirmation to the analyst computing device 108 (Block 230), and the analyst computing device 108 can receive the confirmation request (Block 232), and send back a confirmation of the deployment (Block 234).

In response to the deployment request (and/or the confirmation), the network server 103 can select a security package from the candidate security packages stored thereon, or assemble a security package, based on the host information so that it suits the identified host 110 (Block 236). The network server 103 can then deploy the security package to the identified host 110 (Block 238), and the host 110 receives the security package and run it (Block 240).

Figure 3:
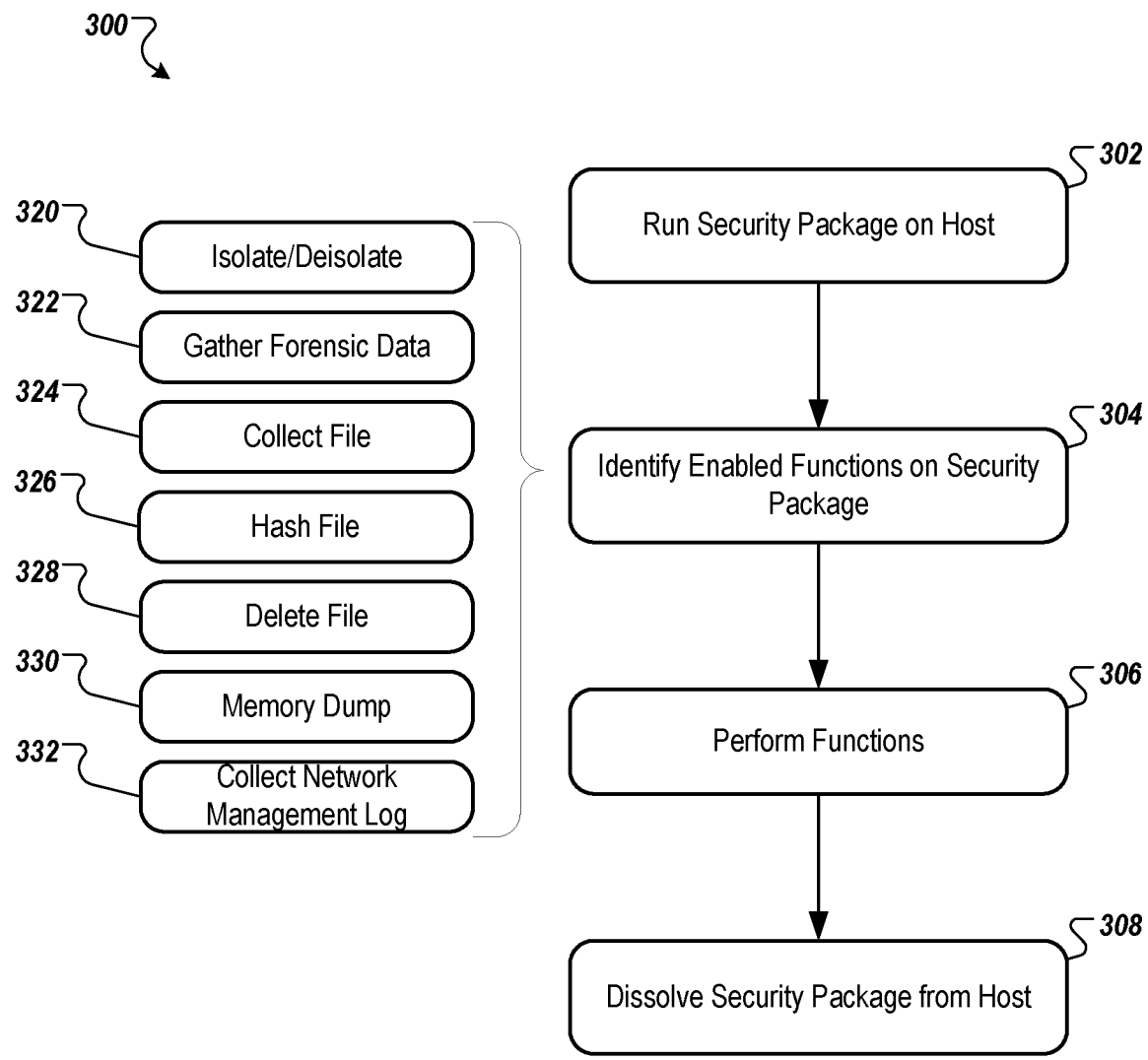
FIG. 3 is a flowchart of an example operation of a security package running on a network host.

FIG. 3 is a flowchart of an example operation 300 of a security package running on a network host. Once a security package is deployed to a host, the security package is executed on the host (Block 302). The security package can be automatically executed when it is deployed on the host. The security package can be configured such that a user of the host cannot intervene the automatic operation of the security package on the host. Alternatively, the security package can be configured to be manually run by a user of the host. In addition or alternatively, the security package can be configured such that a user of the host can interfere with, or modify, the operation of the security package on the host.

The security package causes the host to perform one or more functions included in the security package. The functions to be performed on the host can be selected automatically by the analyst computing device and/or the network server, or manually by a security analyst using the analyst computing device. The host can identify such enabled functions included in the security package (Block 304).

A security package can include a plurality of functions that are available to be performed by the host. Examples of the functions include operations of isolating or deisolating a host from a network (Block 320), gathering forensic data (Block 322), collecting file(s) (Block 324), hashing file(s) (Block 326), deleting file(s) (Block 328), performing memory dump (Block 330), and collecting network management log (Block 332).

The isolation and deisolation functions can be selectively enabled or disabled in a security package so that the security package, when executed, can isolate a host from other network resources, or deisolate the host that has been isolated. An example isolation process is further described herein, for example with reference to FIG. 4.

The forensic data collection function can be selectively enabled or disabled in a security package so that the security package can operate to gather forensic data from a host. An example forensic data collection process is further described herein, for example with reference to FIG. 5.

The file collection function can be selectively enabled or disabled in a security package so that the security package can operate to copy one or more files from a host as requested by, for example, a security analyst. Copied files can be transmitted to the network server and/or the analyst computing device so that the security analyst can review them for further analysis and mitigation.

The file hashing function can be selectively enabled or disabled in a security package so that the security package can operate to hash one or more files to verify their integrity and/or authenticity.

The file deletion function can be selectively enabled or disabled in a security package so that the security package can operate to delete one or more files from a host as requested by, for example, a security analyst. For example, when a particular file is copied from a host and sent to an analyst computing device, a security analyst can review the file and determine if it needs to be deleted from the host. A security analyst can then deploy a security package that includes the file deletion function to the host so that the security package causes the file to be deleted from the host.

The memory dump function can be selectively enabled or disabled in a security package so that the security package can cause a memory dump to be created. A memory dump can be a snapshot capture of the host from a particular instant, and contain forensic data about the status of the host before an incident such as a crash or security compromise. A memory dump can provide information about runtime system activity, including open network connections, recently executed commands or processes, and other data pertaining to malicious attacks or threats (e.g., account credentials, chat messages, encryption keys, injected code fragments, and non-cashable internet history).

The network management log collection function can be selectively enabled or disabled in a security package so that the security package collects a log created as part of the operation of an existing network management system (e.g., a security management application of the network management server 104). For example, the existing network security application of the network management server 104 can collect information from endpoints, such as data from operating systems of the endpoints. By way of example, where the network management server 104 runs a Tanium™ application is used, the security package deployed on a host can collect a log created by Tanium IR Gatherer or Tanium Live.

Before a security package is deployed, one or more of the functions available in the security package can be selectively enabled or disabled automatically by the analyst computing device, and/or manually by a security analyst using the analyst computing device. Further, a security package can be deployed to, and run on, a same host multiple times with different functions that are selectively enabled and disabled by a security analyst. A security package can be configured to record actions that have been performed in one or more previous execution on a host, so that the rest of the actions can be resumed as necessary in a later execution on the same host.

When the enabled functions are identified, the host can perform the functions (Block 306). At least some of the functions can be performed either sequentially or simultaneously. When all the enabled functions are performed and completed, the security package causes the host to dissolve the security package therefrom (Block 308). For example, the security package can be deleted from the host once all the functions are completed.

Figure 4:
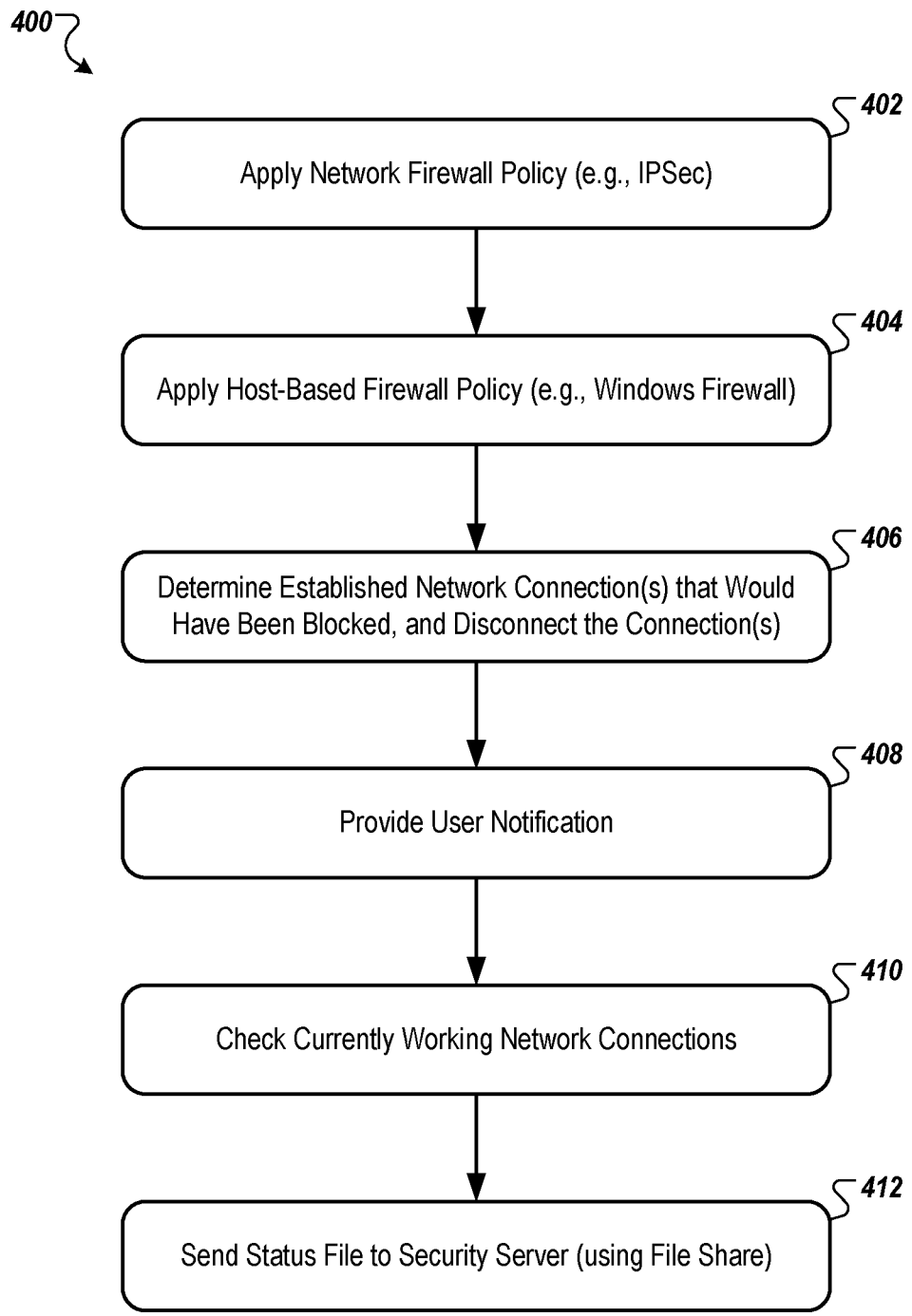
FIG. 4 is a flowchart of an example operation for isolating an affected host in a network.

FIG. 4 is a flowchart of an example operation 400 for isolating an affected host in a network. As described herein, when a security package 130 is deployed and executed on a network host 110, it can cause the host 110 to be isolated itself from other network resources. Instead of shutting down the host 110 (e.g., locking down the device without allowing any process to run), a security package 130 is designed to permit for the affected host 110 to be isolated from other network resources while, at the same time, the deployed security package performs enabled functions, such as collecting and sending back forensic evidence from the host to the network server for further analysis and mitigation process. In addition or alternatively, when the host is isolated, the deployed security package may stop some processes from running on the host while allowing the host to execute other processes that are not vulnerable to a threat. For example, such allowed processes (e.g., commands, functions and network traffics) can be determined based on a predetermined whitelist. By way of example, while being isolated, a host can be allowed to perform phone functionalities (if the host has such functionalities), access the network server, access a SecureCRT jump server, access telecommunications applications (e.g., Skype), access an email server (e.g., Microsoft Exchange Server), permit DNS functions, allow VPN functions, etc.

An example isolation process 400 can begin with applying a network firewall policy (Block 402). For example, the security package 130 can apply an IPSec policy, which is a set of rules that govern when and how the operating system uses the IPSec protocol that is designed to authenticate and encrypt the packets of data sent over an internet protocol network, and can also deny packets that do not match the provided rules. A IPSec firewall policy can be precompiled and used so that it can run fast.

In addition or alternatively, the security package 130 can be designed to apply a host-based firewall policy (Block 404). For example, where the host runs a Windows operating system, the Windows firewall rules can be applied to patch the holes made by the group network policy (e.g., the network firewall policy), the holes having been created by the group network policy that overrules some of the Windows firewall rules while the Windows firewall policy may be stricter than the group network policy.

The security package 130 can determine one or more established network connections that would have been blocked based on the network firewall policy and/or the host-based firewall policy, and disconnect such network connections (Block 406). The security package 130 can be designed to scan all open network connections and determine ones that would have been blocked by the IPSec policy and/or the Windows firewall rules. The security package 130 can then delete such network connections so that they are forced to be closed. Such forced closure of the network connections is performed while allowing other processes that are running on the host, thereby preventing losing such other processes that are currently running or have been running.

The security package 130 can provide a user notification of the isolation (Block 408). A user notification can be generated and presented in various formats. For example, the user notification is provided by replacing the user's normal wallpaper on a display screen with another wallpaper that includes warning statement, color, and/or symbols. Alternatively or in addition, the user notification can be shown in a popup box on the display screen.

Optionally, the security package 130 can run check on currently working network connections (Block 410). For example, the security package 130 can be designed to run a series of quick checks to see what network connections are currently working, and see if they work well.

The security package 130 can operate to send a status file to a security server (e.g., the forensic server 106 and/or the network management server 104) (Block 412). For example, an empty file can be created and stored on the security server, and the security package 130 transmits messages from the host 110 to the security server to write and update the file in real-time or regularly, while the security package performs functions on the host. The messages contain information about the security processes (e.g., the processes in Blocks 402, 404, 406, 408, and 410, and other processes caused by the security package on the host) that have been performed on the host. The messages can be transmitted using a file sharing, thereby updating the file every time one or some processes are performed on the host. Thus, the status file can be updated in real-time or within a short period of time after a process is performed on the host, so that a security analyst can review and/or parse out the status file to quickly check on the status of processes on the host. The transmission of messages to update the status file via a fire sharing is possible despite no network connection is made between the host and the security server. As described herein, the status file via a fire sharing is distinguished from a log file that will be created and transmitted to the security server after all the processes have been performed.

Figure 5:
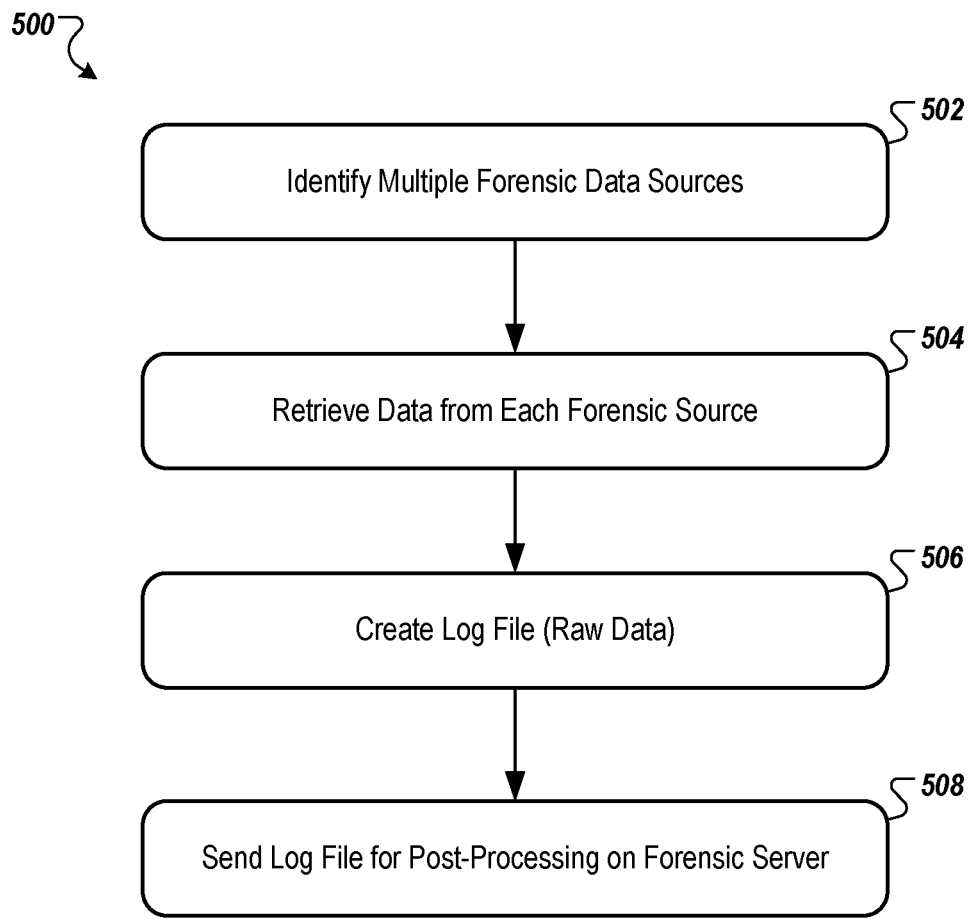
FIG. 5 is a flowchart of an example operation for collecting forensic data on a network host.
Figure 6:
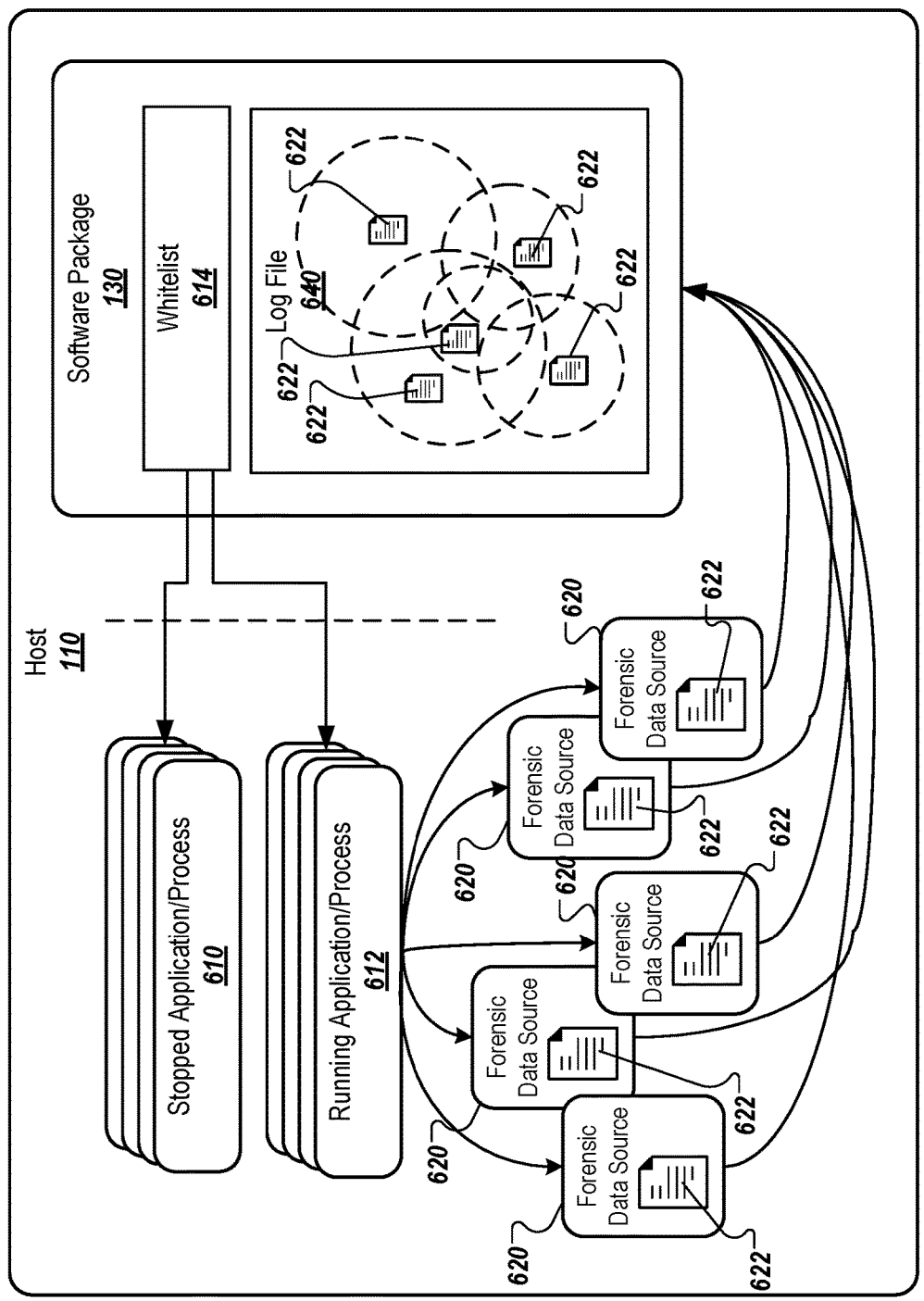
FIG. 6 is a block diagram of a network host that runs a deployed software package to collect forensic data.
Figure 7:
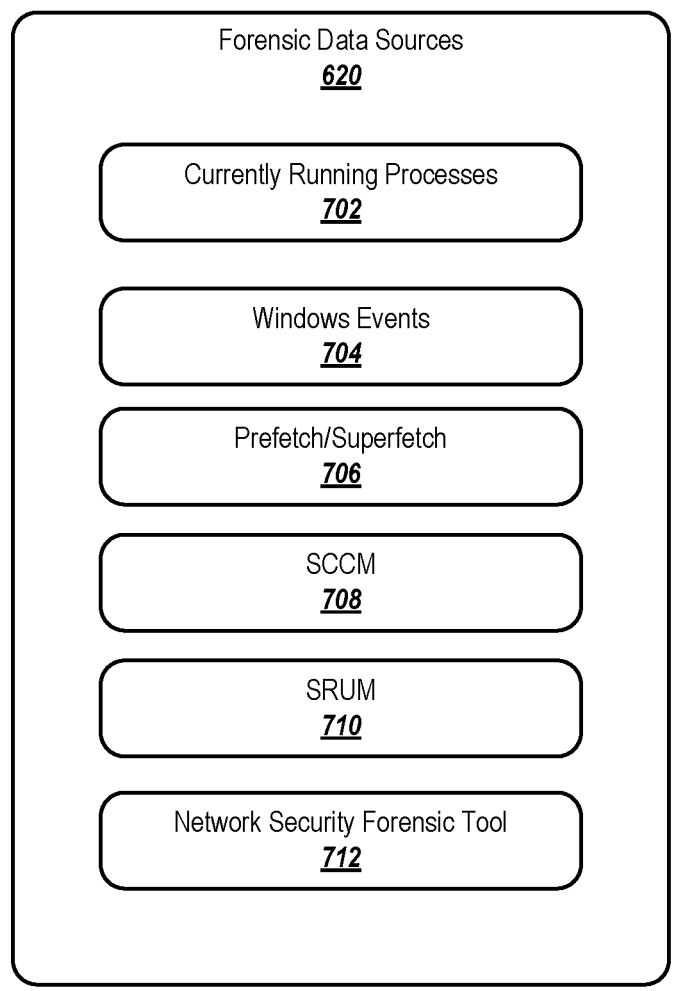
FIG. 7 illustrates example forensic data sources from which forensic information is collected.

Referring to FIGS. 5-7, an example process of collecting forensic data on a network host is described. FIG. 5 is a flowchart of an example operation 500 for collecting forensic data on a network host 110. FIG. 6 is a block diagram of a network host 110 that runs a deployed software package 130 to collect forensic data. FIG. 7 illustrates example forensic data sources from which forensic information is collected.

Referring to FIG. 5, forensic evidence is collected by identifying multiple forensic data sources (Block 502) and retrieving data from each of the forensic data sources (Block 504). Then, a log file can be created based on the forensic data collected from such multiple forensic data sources (Block 506). The log file can be sent to the network server (e.g., the forensic server 106) for post-processing (Block 508). For example, as described herein, the log file, which may be a raw file, can be processed on the network server and converted into formatted data desirable for further security analysis and mitigating actions by security analysts.

Referring to FIG. 6, a security package 130 deployed and running on a network host 110 can perform forensic data collection, such as the operation 500 in FIG. 5. The security package 130 is configured to collect forensic data from redundant sources on the host to ensure that any suspicious or malicious commands, processes and traffics on the host are not missed. For example, the security package 130 is designed to gather all the running processes, files being used, incoming and outgoing network traffics (e.g., amount of traffic, kind of traffic by category (e.g., SQL traffic, software revision control check-ins, HTTP transactions, etc.) or by destination network), ports (open, closed, or filtered), and other host behaviors and events.

The security package 130 can include a predetermined whitelist 614 for allowed applications and/or processes 612. For example, the whitelist 614 includes a list of functionalities to be allowed on a host, such as phone functionalities (if the host has such functionalities), access the network server, access a SecureCRT jump server, access telecommunications applications (e.g., Skype), access an email server (e.g., Microsoft Exchange Server), permit DNS functions, allow VPN functions, etc. In some implementations, one or more of the other applications and/or processes that are not identified in the whitelist 614 can be terminated or stopped from running (e.g., stopped applications and/or processes 610).

The applications and/or processes 612 that continue to run on the host can provide a plurality of forensic data sources 620 from which forensic data 622 can be obtained. Examples of different forensic data sources 620 include currently running processes 702. In addition or alternatively, where the host runs a Windows operating system, the forensic data sources 620 can include one or more of Windows events 704, Prefetch/Superfetch files 706, System Center Configuration Manager (SCCM) 708, and System Resource Usage Monitor (SRUM) 710. Other similar forensic data sources are available for different operating systems.

Prefetch files store specific data bout the applications that have been run to help the operating systems start faster. Prefetch is an algorithm that helps anticipate cache misses (times when Windows requests data that are not stored in the disk cache) and stores that data on the hard disk for easy retrieval. Superfetch data is used to determine which applications will be launched and then load up all the necessary files and data into memory, thereby making the operating system faster and loading frequently used programs faster. The Prefetch and Superfetch data can provide history of all the commands run, arguments, dependencies, times that they run, and other information suitable to learn the programs that have run on a host.

The SCCM 708 is a systems management software product developed by Microsoft. The SCCM is also known as Systems Management Server (SMS) or ConfigMgr. The SCCM is configured report the user of applications for statistical analysis. SCCM can collect inventory data from many sources and track executable files run.

The SRUM 710 is configured to track system resource usage, such as processes and network metrics over time. Process related information, such as process owner, CPU cycles used, data bytes read/written, network data (sent/received), and power consumption, are continuously recorded by the SRUM. The data collected by the SRUM can be used to evaluate a user's activity, and correlate that activity with network-related events, data transfer, processes, etc.

In addition or alternatively, the forensic data sources 620 can include a network security forensic tool 712 incorporated in an existing network security application running on the network server (e.g., a network security application that runs by the network management server 104 in FIG. 1). By way of example, where Tanium™ is used to manage the private network 102, a security investigation tool (e.g., Tanium™ Trace) can be a forensic data source 620.

Referring back to FIG. 6, once the forensic data 622 are collected from the forensic data sources 620, the software package 130 can create a log file 640 that includes the forensic data 622. As described herein, the forensic data 622 are collected redundantly so that some of the forensic data 622 can be overlap or duplicate in the log file 640. Duplicate forensic data collection can fill deficiencies of each of the forensic sources because each of the forensic sources is itself not perfect, well-organized, or easy to interpret. For example, certain malware may be located in a very rare location and couldn't be identified by one or a few different security investigations. Collection from duplicate sources can improve the identification of such sophisticating malware.

The log file 640 is light and easy to be transmitted from the host 110 to the network server 103 (e.g., the forensic server 104 and/or the network management server 106), thereby allowing fast analysis. In some implementations, the network server 103 is not used to analyze the log file, but transmit the log file to an analyst computing device 108 so that a security analyst performs analysis from the log file. In this way, no or little burden is imposed on the network server 103.

In some implementations, a security analyst can review the log file and identify any suspicious file. The security analyst, using the analyst computing device, can then request the network server 103 to trace back to the location of the file on the host, collect the file from the host, and send it back to the analyst (e.g., the analyst computing device) for further analysis. In this case, a security package can be redeployed and/or rerun on the host to locate, grab, and send back the requested file to the analyst computing device.

Figure 8:
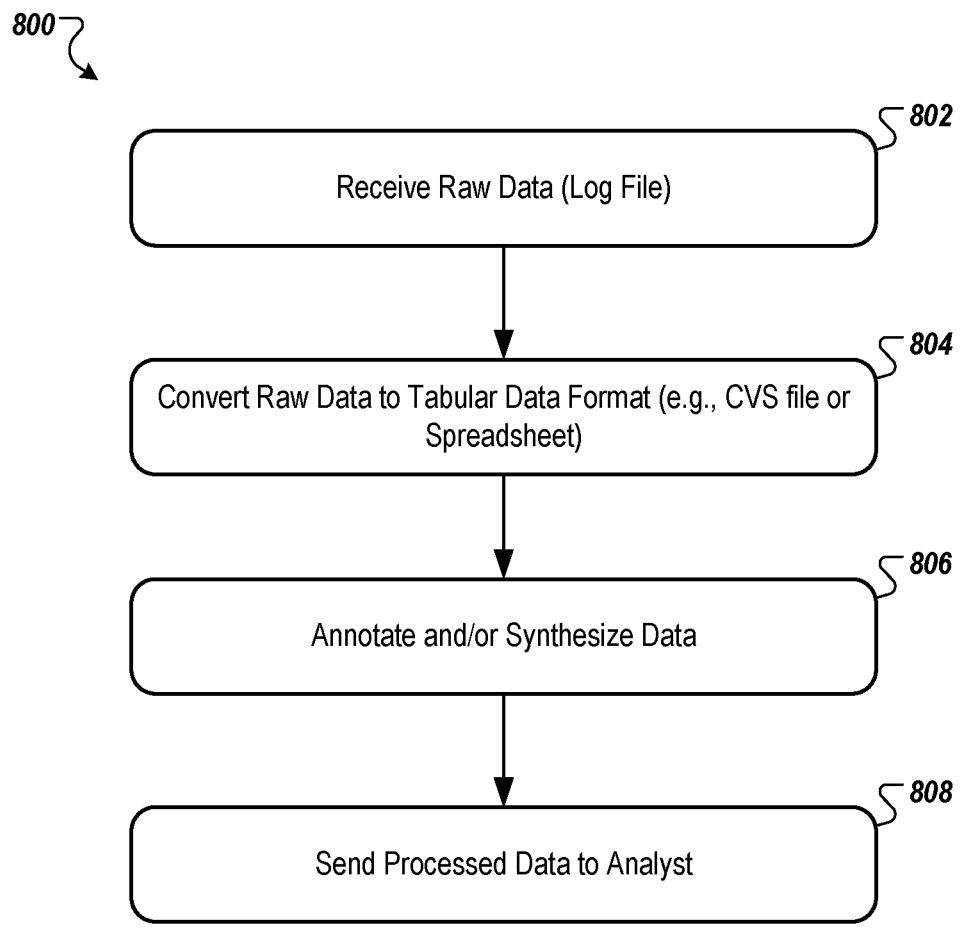
FIG. 8 is a flowchart of an example operation of a post processing.

FIG. 8 is a flowchart of an example operation 800 of a post processing. The network server 103 (e.g., the forensic server 104 and/or the network management server 106) can be used to perform the post-processing. The post processing can begin with receiving raw data of forensic evidence, such as the log file, from a host 110 (Block 802). The network server 103 can be used to convert the raw data to a tabular data format, such as a CVS file or a spreadsheet (Block 804). For example, the raw data can be parsed and/or formatted to a tabular data format that is easy to read.

In addition or alternatively, the network server 103 can be used to annotate and/or synthesize the raw data (Block 806). The raw data can be annotated and/or synthesized in various ways. For example, bad domains and network traffics can be hashed to identify any suspicious activities. Indicator of compromise (IoC) rules can be used to find malicious artifacts, such as known bad file hashes. In addition or alternatively, security analysts can be allowed to make their own rules and analyze the raw data to identify suspicious activities based on the rules. Further, Window events in the raw data can be translated into who the users are. Moreover, browser extensions in the raw data can be found and annotated. Further, all the time stamps in the raw file can be normalized to a particular time zone (e.g., in UTC).

The network server 103 can send the processed data to the analyst computing device 108 so that a security analyst can easily review the processed data. The analyst can identify threats on the host based on the analysis, and determine suitable actions to take to mitigate such threats.

Figure 9:
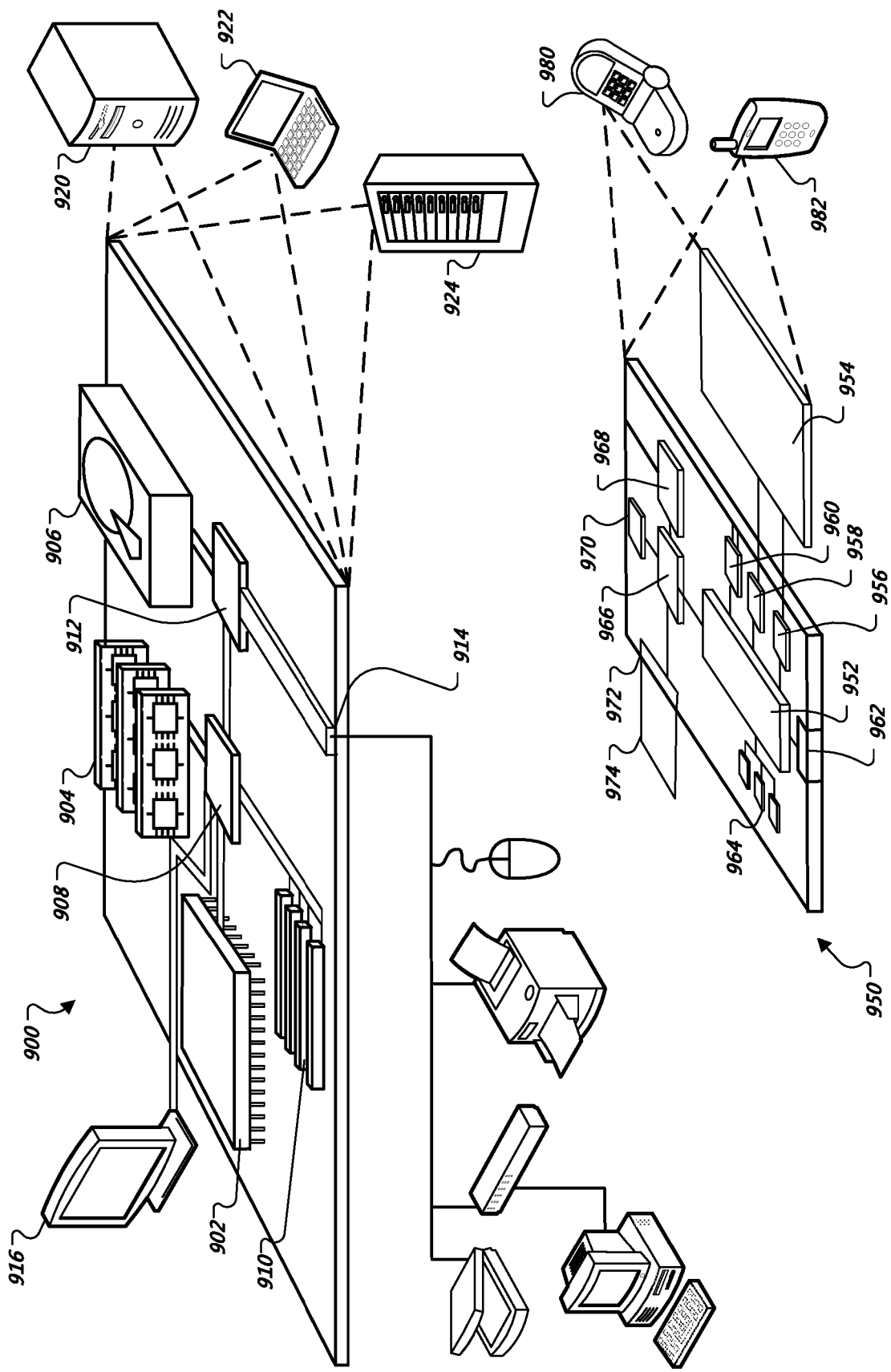
FIG. 9 is a block diagram of computing devices that may be used to implement the systems and methods described in this document.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is an example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may be provided, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for analyzing a security threat, the method comprising:
   storing a plurality of candidate security packages in a central server;
   identifying a network host being affected by a potential security threat;
   based on the identification, transmitting to the identified network host a request for host information about the identified network host, and receiving from the identified network host the host information;
   selecting, based on the host information, a security package from the candidate security packages, the security package configured for the identified network host and formatted to be executable on the identified network host;
   transmitting the security package from the central server to the network host, the security package executed on the network host and configured to cause the network host to collect forensic information from a plurality of forensic data sources of the network host while permitting for the network host to run tasks thereon, wherein the collected forensic information is usable by a security computing device to determine whether the potential security threat is an actual security threat, the security computing device being remote from the central server and the identified network host;
   retrieving the forensic information from the network host; and
   outputting the forensic information to the security computing device, wherein the forensic information is usable to mitigate the actual security threat on the network host,
   wherein the plurality of candidate security packages is designed to mitigate security threats on affected network hosts, and isolate the affected network hosts from other network hosts in a network.

2. The method of claim 1, further comprising:
   updating, using the central server, the plurality of candidate security packages in the central server.

3. The method of claim 1, further comprising:
   processing, using the central server, the forensic information to generate formatted data, the formatted data being used for security analysis.

4. The method of claim 3, wherein the formatted data include a tabular data format.

5. The method of claim 1, wherein the security package is configured as a self-contained, single executable file.

6. The method of claim 1, wherein the security package is configured to create a log file based on the forensic information.

7. The method of claim 1, wherein at least some of the plurality of forensic data sources provide redundant forensic information.

8. The method of claim 1, wherein the forensic information includes one or more of system logs, window events, firewall logs, SEP logs, driver logs, memory logs, and registry on the network host.

9. The method of claim 1, wherein the security package is configured to cause the network host to be isolated from other network resources.

10. The method of claim 1, wherein the security package is configured to dissolve after the forensic information is collected from the plurality of forensic data sources of the network host.

11. The method of claim 1, wherein the security package is configured to perform at least one of collecting a file, hashing a file, deleting a file, and creating a memory dump.

12. A method of identifying a security threat, the method comprising:
   running a plurality of processes using a network host;
   based on a potential security threat being identified at the network host, receiving, at the network host, a request for host information about the network host and sending, from the network host to a central server, the host information;
   receiving, using the network host and based on the host information, a security package from a central server, the security package configured for the network host and formatted to the executable on the network host; and
   executing, using the network host, the security package to cause the network host to perform:
      stopping one or more of the running processes on the network host, the one or more of the running processes being determined based on a security rule;
      permitting for the other running processes to continue to run on the network host;
      collecting forensic data from a plurality of forensic data sources associated with the other running processes, the plurality of forensic data providing data that are at least partially redundant, wherein the collected forensic data is usable to determine whether the potential security threat is an actual security threat;
      creating a log file from the forensic data; and
      transmitting the log file to the central server,
   wherein the security package further causes the network host to perform:
      collecting a file from the network host and sending the file to the central server;
      hashing a file on the network host; and
      deleting a file from the network host.

13. The method of claim 12, wherein the security package further causes the network host to perform:
   creating a memory dump on the network host.

14. The method of claim 12, wherein the forensic data sources include running processes, files being used, incoming and outgoing network traffics, and open ports.

15. The method of claim 12, wherein the security package further causes the network host to perform:
   dissolving the security package from the network host.

16. The method of claim 12, wherein the security package is configured as a self-contained, single executable file.

17. The method of claim 12, wherein the security package is stored and managed in the central server before deployed to the network host.

18. A non-transitory computer-readable medium having stored therein a program for causing a network host to execute a process of identifying a security threat on the network host, the process comprising:
   based on a potential security threat being identified at the network host, receiving a request for host information about the network host and sending, to a central server, the host information;
   receiving, based on the host information, a security package from a central server, the security package configured for the network host and formatted to the executable on the network host;
   stopping one or more of running processes on the network host, the one or more of running processes being determined based on a security rule;
   permitting for the other running processes to continue to run on the network host;
   collecting forensic data from a plurality of forensic data sources associated with the other running processes, the plurality of forensic data providing data that are at least partially redundant, wherein the collected forensic data is usable to determine whether the potential security threat is an actual security threat;
   creating a log file from the forensic data; and
   transmitting the log file to a central server,
   wherein the security package further causes the network host to perform:
      collecting a file from the network host and sending the file to the central server;
      hashing a file on the network host; and
      deleting a file from the network host.

* * * * *